United States Patent
Lee et al.

(10) Patent No.: US 8,595,327 B2
(45) Date of Patent: Nov. 26, 2013

(54) OBTAINING INSTRUMENTATION DATA

(75) Inventors: Tze Meng Lee, San Carlos, CA (US); Aladdin Aly Nassar, Santa Clara, CA (US); Dan Dover, San Francisco, CA (US); Raul Adrian Duran, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 140 days.

(21) Appl. No.: 12/421,650

(22) Filed: Apr. 10, 2009

(65) Prior Publication Data

US 2010/0262646 A1  Oct. 14, 2010

(51) Int. Cl.
*G06F 15/16* (2006.01)

(52) U.S. Cl.
USPC ............ 709/219; 709/225; 702/182; 702/186

(58) Field of Classification Search
USPC ............................ 709/219, 225; 702/182, 186
See application file for complete search history.

(56) References Cited

U.S. PATENT DOCUMENTS

| | | | |
|---|---|---|---|
| 6,963,874 B2 | 11/2005 | Kasriel et al. | |
| 2002/0078203 A1* | 6/2002 | Greschler et al. | 709/225 |
| 2002/0147570 A1* | 10/2002 | Kraft et al. | 702/186 |
| 2002/0184364 A1* | 12/2002 | Brebner | 709/224 |
| 2003/0078964 A1 | 4/2003 | Parrella et al. | |
| 2004/0001223 A1 | 1/2004 | Tanaka | |
| 2004/0267906 A1* | 12/2004 | Truty | 709/219 |
| 2007/0244905 A1 | 10/2007 | Ito et al. | |
| 2008/0005295 A1* | 1/2008 | Burroughs et al. | 709/223 |
| 2008/0010338 A1 | 1/2008 | Curtis et al. | |
| 2008/0059411 A1 | 3/2008 | Greiner et al. | |
| 2008/0228910 A1 | 9/2008 | Petri | |
| 2008/0238929 A1 | 10/2008 | Abdo et al. | |
| 2010/0138437 A1* | 6/2010 | Nadig et al. | 707/759 |

OTHER PUBLICATIONS

"System Configuration Collector Server 1.7.3", retrieved at <<http://linux.softpedia.com/get/System/Monitoring/System-Configuration-Collector-Server-3241.shtml>>, Feb. 12, 2009, pp. 2.

Kiciman, et al., "AjaxScope: A Platform for Remotely Monitoring the Client-Side Behavior of Web 2.0 Applications", 21st ACM Symposium on Operating Systems Principles, retrieved at <<http://www.sosp2007.org/papers/sosp095-kiciman.pdf>>, Oct. 14-17, 2007, pp. 14.

* cited by examiner

*Primary Examiner* — Tonia L Dollinger
*Assistant Examiner* — Adam Cooney
(74) *Attorney, Agent, or Firm* — Medley, Behrens & Lewis, LLC

(57) ABSTRACT

An apparatus described herein includes a request receiver component that receives a request for application data over a network from a client computing device. The apparatus also includes an instrumentation component that causes instrumentation logic to be transmitted to the client computing device responsive to receipt of the request for the application data. The instrumentation logic is configured to cause the client computing device to analyze a cookie to determine whether to capture instrumentation data pertaining to the client and, if it is determined that instrumentation data is desirably captured. The instrumentation logic is also configured to cause the client computing device to capture quantitative instrumentation data pertaining to the requested application data and cause the client computing device to transmit the quantitative instrumentation data over the network to a data repository.

20 Claims, 9 Drawing Sheets

OBTAINING INSTRUMENTATION DATA

BACKGROUND

Advances in computing and network technologies as well as reduction in costs corresponding thereto has allowed billions of users to have access to content made available on the World Wide Web. Such content may include news sites, web logs, sites where applications can be downloaded, gaming sites, etc. Additionally, users can access web services made available by web service providers. For instance, billions of individuals have e-mail accounts, wherein a user, located almost anywhere in the world, can send and receive e-mails nearly instantaneously with other individuals that are in various geographic locations.

Receivers of content available on the World Wide Web and/or users of web services may review content or use such services in various different manners. For example, with respect to e-mail, a first user may log in and log out of their e-mail account several times over the course of a day. A second user may log in to her e-mail account and leave such account open for the entirety of the day. It is important for content providers and web service providers to retain current reviewers/users as well as attract new reviewers/users to their content/services. Specifically, revenue generated by content providers or web service providers often is related to an amount of advertising that is shown with respect to content or services. Accordingly, an advertiser is willing to pay more to cause advertisements to be shown with respect to a particular web site/web page if such web site or web page has a high number of reviewers/users.

Therefore, web service providers typically attempt to continuously to improve their service to attract additional users. Currently, however, there is no suitable mechanism for obtaining quantitative data from a client computing device with respect to a service provided to such client. For instance, the web service provider has no way of knowing, for a particular browser, how long it takes to load a web page requested by a user of the client computing device.

SUMMARY

The following is a brief summary of subject matter that is described in greater detail herein. This summary is not intended to be limiting as to the scope of the claims.

Various technologies pertaining to obtaining quantitative instrumentation data from a client computing device are described in detail herein. Pursuant to an example, a user of a client computing device can use such client computing device to request application data from an application provider over a network (e.g., the Internet). The requested application data can be, for instance, a web page pertaining to a web site/web service. For example, the web service can be an e-mail application. Thus, the request generated at the client computing device may be a request to view an e-mail inbox of the user.

Upon receipt of the request, the application provider (e.g., a web service provider) can provide application data to be transmitted to the client computing device and can also provide instrumentation logic that is transmitted to the client computing device. In an example, the application data provided may be a web page and the instrumentation logic may be embedded in such web page. The instrumentation logic when received by the client computing device can cause the client computing device to generate various instrumentation data and transmit such instrumentation data to a data repository specified in the instrumentation logic. For instance, the instrumentation data may include an amount of time to load a web page as measured at the client computing device, network latencies between the client computing device and the application provider, throughput of the network as experienced by the client computing device, size of a message received by the client computing device, a transaction undertaken on the client computing device (e.g., viewing an e-mail, sending an e-mail), country where the client computing device resides, identity of one or more servers communicating with the client computing device, a type of browser used in the client computing device, resolution of the browser, and/or operating system used on the client computing device, amongst other data.

It may be desirable to refrain from obtaining instrumentation data from each user of the application (the web service) as, for services with a large number of users, obtaining instrumentation data from each of such users could cause the service to perform sub-optimally. Accordingly, the instrumentation logic provided to the client computing device may include logic for determining whether or not the user is desirably instrumented (e.g., sampled or subject to instrumentation sampling). For instance, the instrumentation logic can include logic that causes users to be randomly selected for instrumentation through use of a defined probability. If the user is selected for instrumentation, the instrumentation logic may include a time limit and/or transaction limit with respect to obtaining instrumentation data. If the user is not selected, then the instrumentation logic may include a time limit within which the user may not be selected for instrumentation.

Other aspects will be appreciated upon reading and understanding the attached figures and description.

DETAILED DESCRIPTION

Figure 1:
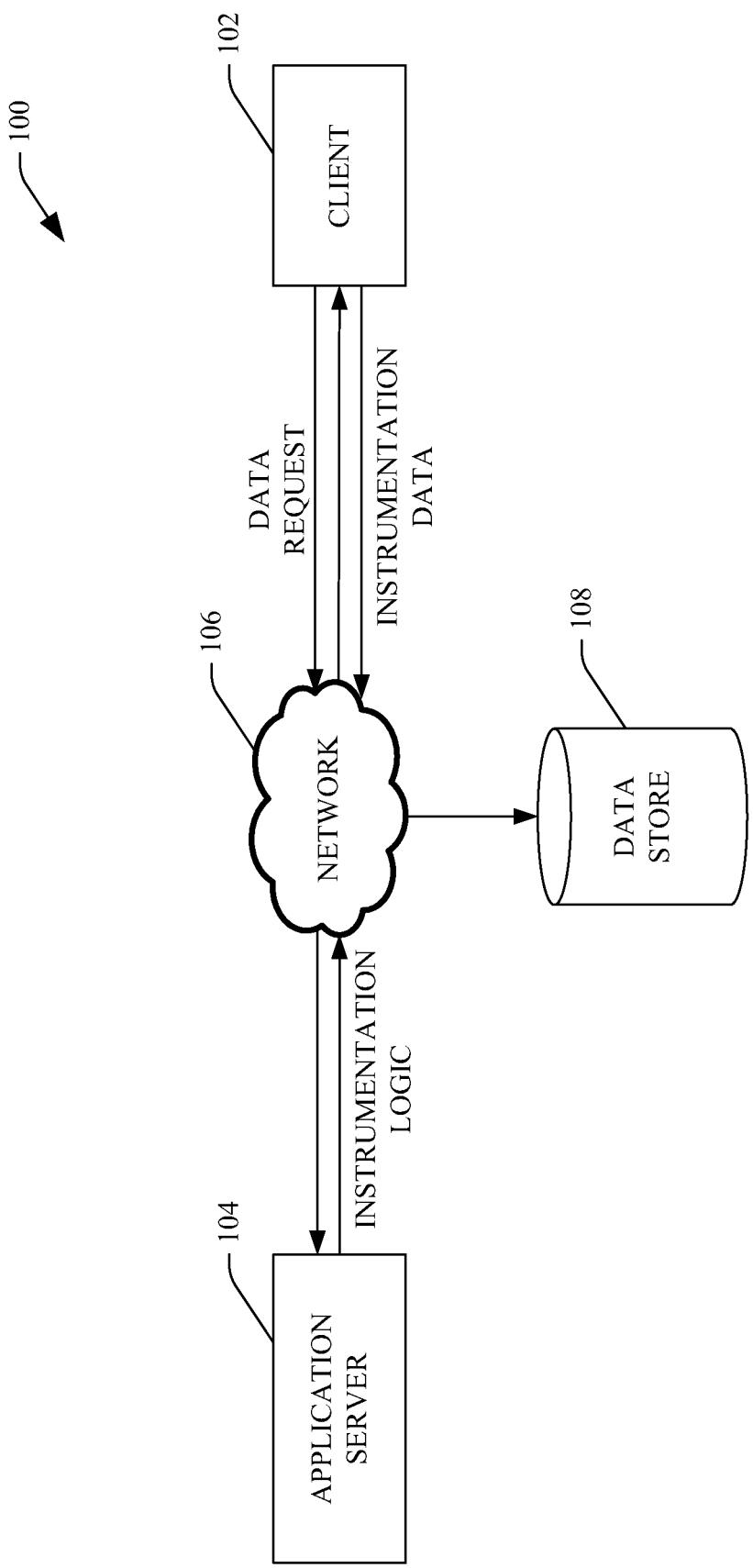
FIG. 1 is a functional block diagram of an example system that facilitates obtaining instrumentation data from a client computing device.

Various technologies pertaining to obtaining instrumentation data with respect to an application/service from a client computing device will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates causing a client computing device to output instrumentation data pertaining to an application provided to the client computing device by way of a network is illustrated. The system 100 includes a client computing device 102. The client computing device 102 may be any suitable computing device including but not limited to a desktop computer, a laptop computer, a personal digital assistant, a mobile telephone, etc. The system 100 additionally includes an application server 104 that provides an application and/or data pertaining to an application to client computing devices such as the client computing device 102. For instance, the application server 104 may be a web server used in connection with providing client computing devices a web service. In a detailed example, the application server 104 may be a server that is configured to provide an e-mail service to client computing devices. The client computing device 102 can be in communication with the application server 104 by way of a network 106. The network 106 may be or include the Internet, a cellular network, an intranet, etc. and may include devices used in connection with wired or wireless communications. The system 100 further includes a data store 108 that is in communication with the client computing device 102 by way of the network 106. The data store 108 is configured to receive and retain instrumentation data output by the client computing device 102.

In operation, the client computing device 102 may output a data request pertaining to an application/service provided by the application server 104. In an example, the user of the client computing device 102 may request access to a certain web page such as an e-mail page corresponding to an e-mail account of the user. Thus, the client computing device 102 can generate a data request responsive to receiving authentication information from the user (e.g., a user name and password), may output the data request responsive to the user employing a browser to navigate to a certain web page, etc.

The application server 104 can receive the request and responsive to receipt of the request, can cause instrumentation logic to be transmitted to the client computing device 102 by way of the network 106. Pursuant to an example, the client computing device 102 can request a particular web page from the application server 104. Responsive to receipt of the request, the application server 104 can embed instrumentation logic in the web page and transmit such web page with instrumentation logic embedded therein to the client computing device 102. Content of the instrumentation logic will be described in greater detail herein.

The client computing device can receive the web page with the implementation logic embedded therein and can parse at least some of the instrumentation logic and load configuration settings included in the instrumentation logic. The instrumentation logic received at the client computing device 102 can cause the client computing device 102 to perform a variety of actions. First, the client computing device 102 can execute at least a portion of the instrumentation logic to determine whether the user of the client computing device 102 is to be sampled during a sampling session. For instance, as will be described in greater detail below, the instrumentation logic can include logic that initializes a sampling session and determines randomly or pseudo-randomly with a predefined probability whether the user of the client computing device 102 should be subjected to sampling (subjected to outputting instrumentation data) during the initialized sampling session.

The instrumentation logic can also be configured to cause the client computing device 102 to ascertain whether a predefined time limit and/or predefined transaction limit has been surpassed. As will be discussed below, such transaction limits and time limits can be monitored through use of cookies transmitted between the client computing device 102 and the application server 104. If it is ascertained that the user of the client computing device 102 should be subjected to sampling, that a time limit for the sampling session has not been surpassed, and that a transaction limit for the sampling session has not been surpassed, then the instrumentation logic can be configured to cause the client computing device 102 to generate instrumentation data pertaining to the application as experienced/executed on the client computing device 102.

Pursuant to an example, if the client computing device 102 requests a web page from the application server 104, the instrumentation logic can cause the client computing device 102 to generate at least some of the following instrumentation data: load time of a web page, network latency between the client computing device 102 and the application server 104 as viewed from the client computing device 102, throughput of the network 106 as experienced by the client computing device 102, size of a message received by the client computing device 102, a particular transaction undertaken by the client computing device 102, country where the client computing device 102 resides, identity of the application server 104 that is communicating with the client computing device 102, a browser type used in the client computing device 102 to view the web page, resolution of the browser on the client computing device 102, operating system used on the client computing device 102, etc.

The instrumentation logic can further include instructions to cause instrumentation data generated by the client computing device 102 to be directed to the data store 108. For instance, the instrumentation logic can include an address of the data store 108 on the network 106 such that the client computing device 102 can output instrumentation data that is to be received and retained in the data store 108. Pursuant to an example, the instrumentation data can be transmitted by way of an image tag from the client computing device 102 to the data store 108.

The instrumentation logic can additionally cause the client computing device 102 to provide instrumentation data pertaining to whether or not the client computing device 102 was communicating with the application server 104 in a cached session. With respect to many applications, caching may be useful as some providers' JavaScript is heavily cached and application providers often get enhanced performance during cached sessions. In an example, to determine if the client computing device 102 is in a cached session with the application server 104, the instrumentation logic can cause the client computing device 102 to output an "HTTP Get" command to an image file on the application server 104, wherein for such image file the image file has a substantially similar cache policy to all other image files on the application server 104. Thus, the image file acts as a proxy to determine whether the client 102 is in a cached session with the application server 104. If headers are not included in the instrumentation data provided to the data store 108, it can be inferred that the session was a cached session.

The instrumentation logic can further include logic that causes the client computing device 102 to assign a unique anonymous identifier to instrumentation data output by the client computing device 102 and received by the data store 108. Thus, path information for an anonymous person can be reviewed to understand how users interact with the application provided by the application server 104.

The instrumentation logic received by the client computing device 102 can also cause the client computing device 102 to assemble a serialized name pair data set URL. Such URL may be provided to the data store 108. The destination server name in the URL may be configurable for integration into new/ different data providers and the path name of the URL may be configurable to allow for versioning. The aforementioned anonymous identifier may be a one-way hash of the user's nonidentifiable identity number assigned to such user by the application server 104.

While the above examples have depicted the client computing device 102 using a browser to request a web page from the application server 104, it is to be understood that aspects described above can be applied with respect to different application/services. For instance, the client computing device 102 may output a dynamic asynchronous call such as an Ajax call to the application server 104. In response thereto, the application server 104 can embed instrumentation logic into data provided in response to the Ajax call. Further, the client computing device 102 may be using a client side application that can load HTML. Thus, for instance, the client side application may be an instant messaging application, as many instant messaging applications can communicate by way of HTTP and have access to cookies.

Figure 2:
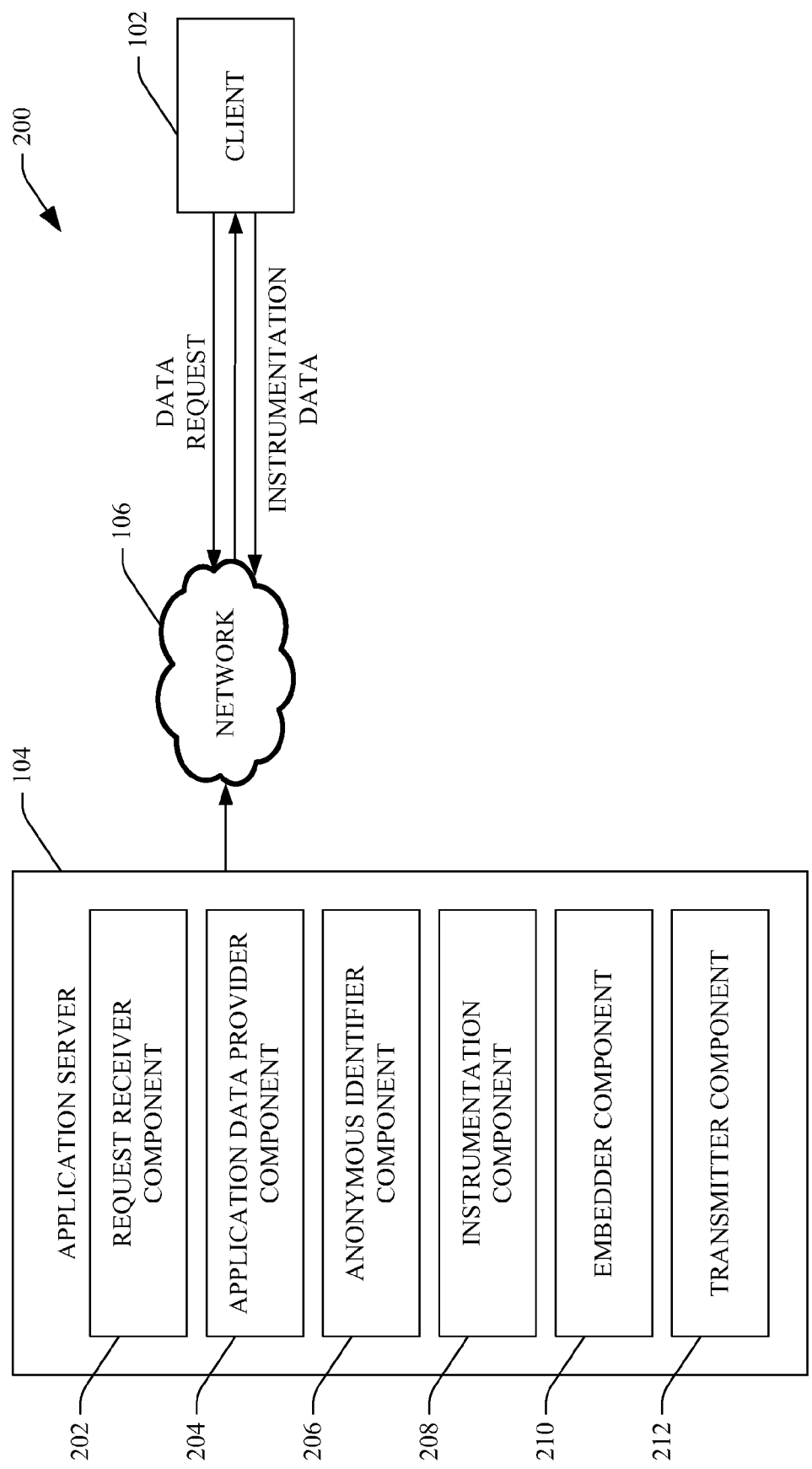
FIG. 2 is a functional block diagram of an example system that facilitates generating instrumentation logic and transmitting such logic to the client computing device.

Referring now to FIG. 2, an example system 200 that facilitates causing a client computing device to generate instrumentation data is illustrated. The system 200 includes the client computing device 102, which outputs a data request that is to be received by the application server 104 by way of the network 106. As noted above, the data request can be a request for a web page, an asynchronous call to the application server (e.g., an Ajax call), a request from an instant messaging application, etc.

The application server 104 includes a request receiver component 202 that receives the data request from the client computing device 102. The application server 104 additionally includes an application data provider component 204 that generates/formats application data in response to the request receiver component 202 receiving the data request from the client computing device 102. For instance, if the data request is a request for a web page, the application data provider component 204 can generate/format the web page for transmittal to the client computing device 102 for display through use of a browser.

The application server 104 may also include an anonymous identifier component 206 that can assign an anonymous unique identification to a user of the client computing device 102 that causes the data request to be output by the client computing device 102. For instance, if the application server 104 is configured to provide an e-mail service to client computing devices, the anonymous identifier component 206 can generate an anonymous unique identification for a user upon the user signing in to their e-mail account (or other service that corresponds to the e-mail account). The anonymous identification can be assigned to the user over all sessions or over a single session, wherein a session can be defined by a certain amount of time, a certain number of transactions, etc. The unique anonymous identification generated by the anonymous identifier component 206 can be retained on the application server 104 such that it is transmitted to the client computing device 102 for each transaction undertaken by the client computing device 102 when such device 102 is subjected to instrumentation sampling. In another example, the unique identifier generated by the anonymous identifier component 206 can be stored on the client computing device 102 and transmitted therefrom upon the client computing device 102 generating instrumentation data. Of course, the unique anonymous identifier may also be stored elsewhere so long as it can be appended to instrumentation data output by the client computing device 102.

The application server 104 also includes an instrumentation component 208 that generates instrumentation logic that is to be transmitted to the client computing device 102 together with application data generated by the application data provider component 204. The instrumentation component 204 can generate instrumentation logic that includes logic that causes the client computing device 102 to generate certain instrumentation data, configurations instructing the client computing device 102 with respect to instrumentation sampling session management, configurations pertaining to whether sampling is desired at all, etc. Instrumentation logic output by the instrumentation component 208 is described in greater detail below.

The application server 104 may further include an embedder component 210 that causes the instrumentation logic generated by the instrumentation component 208 to be embedded in application data generated by the application data provider component 204. In an example, the application data provider component 204 can generate a web page and the embedder component 210 can cause the instrumentation logic to be embedded in the web page output by the application data provider component 204. In another example the data request may be an asynchronous data call. The embedder component 210 can cause instrumentation logic generated by the instrumentation component 208 to be embedded in data output by the application data provider component 204 in response to receipt of the asynchronous data call.

The application server 104 can also include a transmitter component 212 that causes application data output by the application data provider component 204 (with instrumentation logic generated by the instrumentation component 208 embedded therein by the embedder component 210) to be transmitted to the client computing device 102 by way of the network 106. For instance, the transmitter component 212 can cause the aforementioned data to be transmitted by way of HTTP.

Figure 3:
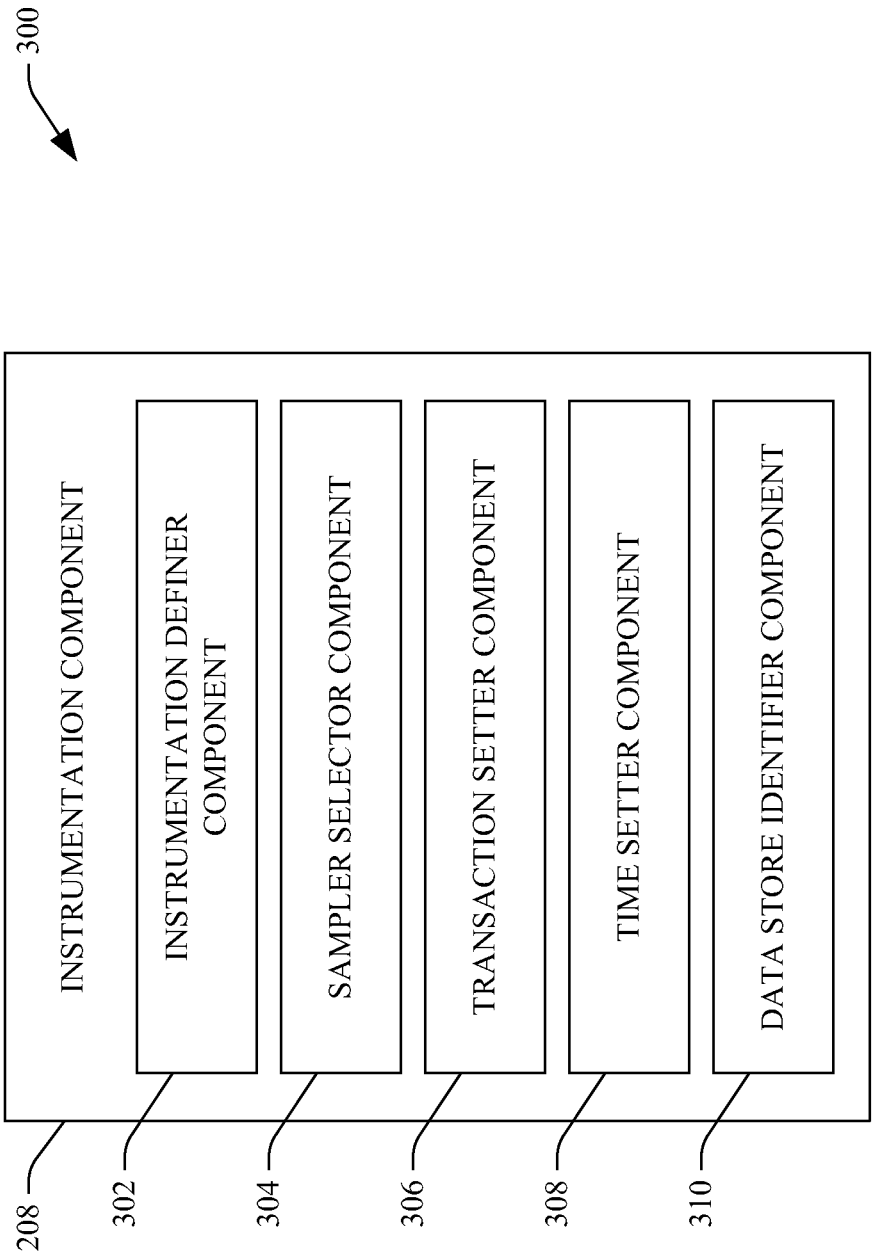
FIG. 3 is a functional block diagram of an example instrumentation component that is configured to generate instrumentation logic for transmittal to a client computing device.

Now turning to FIG. 3, an example depiction 300 of the instrumentation component 208 is illustrated. As shown, the instrumentation component 208 may include an instrumentation definer component 302 that generates logic defining what type of instrumentation data is to be captured from the client computing device 102 (FIG. 1). Thus, the instrumentation definer component 302 can generate logic that causes the client computing device 102 to output a variety of different types of instrumentation data such as load time of a web page or load time of data received in response to an asynchronous call (as timed at the client computing device 102), network latency between the client computing device 102 and the server providing data, throughput of the network as experienced by the client computing device 102, an amount of data received by the client computing device 102 in response to transmittal of a request for data from the client computing device 102, a transaction undertaken by the client computing device 102 (sending an e-mail, receiving an e-mail, opening a contacts menu), country where the client computing device 102 resides, etc.

The instrumentation component 208 can further include a sampler selector component 304 that generates logic pertaining to determining whether or not a client computing device should be selected for instrumentation sampling. For instance, the sampler selector component 304 can define a probability with respect to which a client computing device may be selected for instrumentation sampling. When the client computing device 102 receives such logic, a random or pseudo-random determination can be made in accordance with the defined probability regarding whether the client computing device 102 should be subjected to instrumentation sampling. Alternatively, such determination can be made at the application server 104 instead of at the client computing device 102.

The instrumentation component 208 may also include a transaction setter component 306 that defines a maximum number of transactions that can be instrumented during a particular sampling session (e.g., if the client computing device 102 is selected for instrumentation sampling). For instance, many spammers use e-mail services to generate spam e-mails for delivery to other e-mail services. Thus, the transaction setter component 306 can set a maximum number of transactions for sampling to avoid skewing of the data caused, for instance, by spammers.

The instrumentation component 208 may further include a time setter component 308 that causes a time threshold to be included in the instrumentation logic that defines an amount of time that the client computing device 102 may be sampled. That is, the time setter component 308 outputs a time restriction on a sampling session (or a time restriction that a user may not be sampled). Again, using the e-mail example, many e-mail users open their e-mail inbox and leave such inbox open in the browser for a very long period of time. If a user leaves their browser open with e-mail running therein, the value of sampling may decrease over time. Accordingly, the time setter component 308 can output logic that restricts a length of a sampling session.

The instrumentation component 208 may also include a data store identifier component 310 that outputs data identifying where instrumentation data generated by the client computing device 102 is to be directed. As noted previously, the data store identifier component 310 can cause a client computing device 102 to output data by way of a URL, wherein the destination server name is configurable to allow for integration of new/different data providers while the path name is confirmable to allow for versioning.

Figure 4:
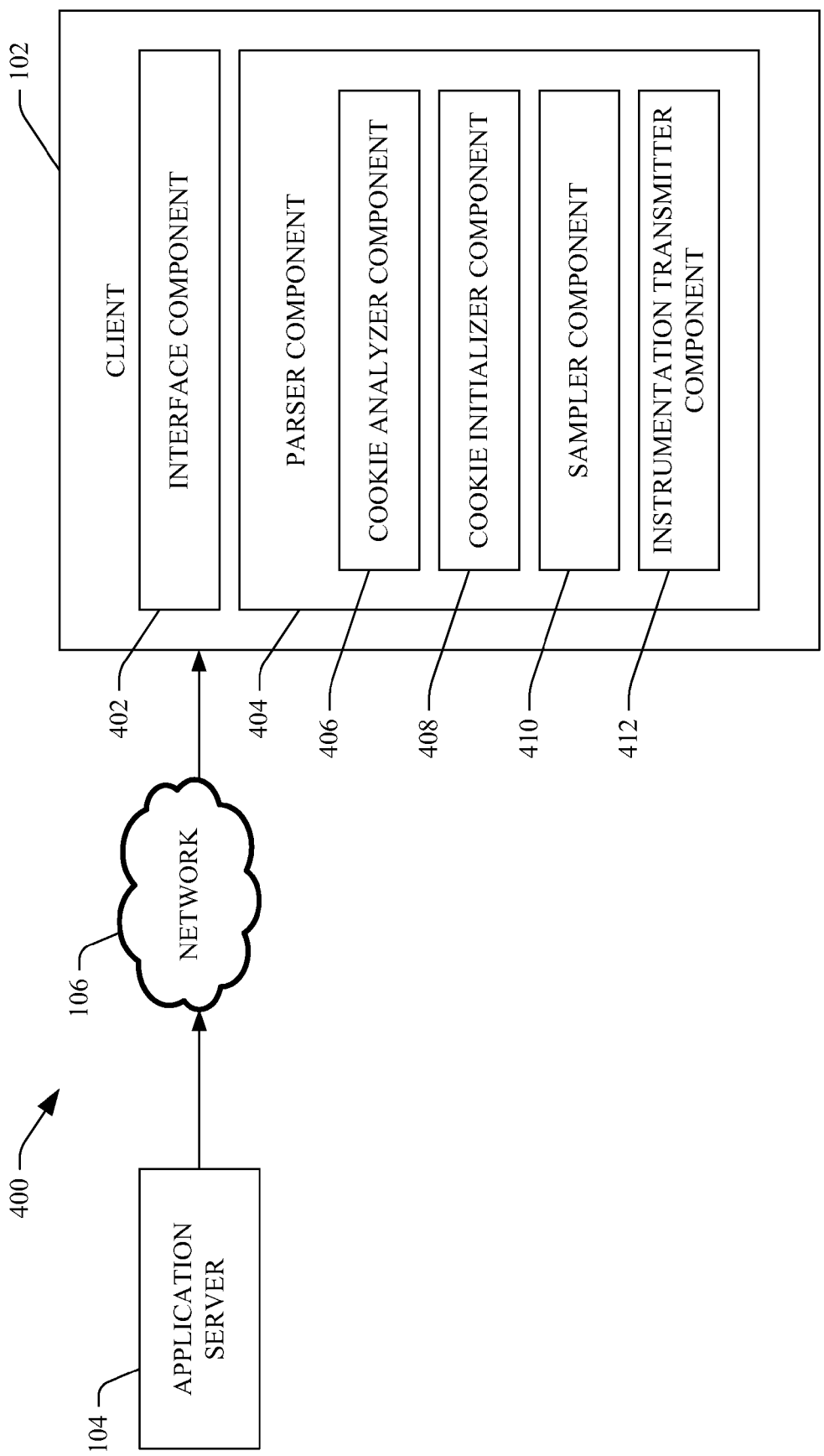
FIG. 4 is a functional block diagram of an example system that facilitates generating instrumentation data responsive to receipt of instrumentation logic.

With reference now to FIG. 4, an example system 400 that facilitates generating instrumentation data at the client computing device 102 is illustrated. The system includes a client computing device 102 and the application server 104, which interact by way of the network 106 as described above. The client computing device 102 includes an interface component 402 that is configured to receive application data transmitted by the application server 104. Thus for instance the interface component 402 can receive a web page provided by the application server 104 with instrumentation logic embedded therein.

The client computing device 102 may additionally include a parser component 404 that parses data received from the application server 104, including the embedded instrumentation logic. In an example, the embedded instrumentation logic can have at least three different portions: a first portion, which may be in the form of a JavaScript file, may include logic that causes the client computing device 102 to generate certain types of instrumentation data. This logic may include logic with respect to particular types of transactions such as transactions pertaining to web pages that send data by way of forms, asynchronous calls within pages, etc.

A second portion of the instrumentation logic may include configurations defined at the application server 104 (server side configurations), wherein such configurations can be placed into the page of a client. Such configurations may pertain to transaction limits and time limits discussed above. The server side configurations may also include information indicating whether it is desirable to perform any sampling at all at the current time. For instance this can be referred to as a kill switch which prohibits the client computing device 102 from performing any sampling. If the parser component 404 detects that the kill switch has been turned on, then the client computing device 102 may perform no samplings. A third portion of the instrumentation logic may include an image tag that contains source of a data provider where all instrumentation data is to be sent (described above as being generated by the data store identifier component 310).

Upon receipt of the embedded instrumentation logic, the parser component 404 can be instructed by such logic to initiate a timer on the client computing device 102. The parser component 404 may then review the aforementioned kill switch to determine whether any sampling is desired. If the kill switch is enabled, no sampling is undertaken. If the kill switch is not enabled, a cookie analyzer component 406 analyzes a cookie transmitted to the client computing device 102 by the application server 104 to determine whether or not a sampling session has previously been undertaken. For instance, the cookie analyzer component 406 can analyze the cookie to ascertain whether the user has used the application provided by the application server 104 within a threshold period of time. Thus, the cookie may be a session cookie or a permanent cookie. The parser component may additionally include a cookie initializer component 408 that can initialize a cookie if the cookie analyzer component 406 determines that the cookie has yet to be initialized. For instance, the cookie initializer component 408 can receive configurations in the instrumentation logic that define a probability that is desired with respect to selecting which users to sample. In an example, the configurations may indicate that it is desirable to obtain instrumentation data for three percent of possible sampling sessions. The cookie initializer component 408 may then randomly determine, while considering the defined probability, whether or not to sample the user that is using the client computing device 102. If the user is to be sampled, the cookie initializer component 408 can output an indication that the user is desirably sampled (e.g., set a "winner" bit), and such bit can be set in the cookie. If it is determined randomly or pseudo-randomly (with respect to the defined probability) that the user is not to be sampled, the cookie initializer component 408 can set a "loser" bit (e.g., set the loser bit in the cookie). Again these actions can be undertaken by the cookie initializer component 408 upon receipt of a page click, for example, or some other suitable action undertaken by the user.

The parser component 404 may then monitor user actions for a change in status of the web page (e.g., determine when a landing page is loaded). When a landing page is loaded, the parser component 404 can stop the timer in the client computing device 102. This time information can be indicative of an amount of time used to load a particular page at the client computing device 102. Once the timer has been stopped, the parser component 404 can again analyze the kill switch. If the kill switch has been set, the cookie can be deleted/reset. If the kill switch has not been set, then the parser component 404 can analyze the cookie to determine whether the cookie has been initialized. Determining whether or not the cookie has been analyzed can include determining whether a winner bit or a loser bit has been set by the cookie initializer component 408.

The parser component 404 may additionally include a sampler component 410 that can cause the client computing device 102 to generate instrumentation data in accordance with the instrumentation logic received from the application server 104 if the winner bit has been set. For example, the sampler component 410 can determine which of the winner bit or the loser bit has been set. If the sampler component 410 determines that the loser bit has been set, then the sampler component 410 can determine whether a defined time threshold has been surpassed. The defined time threshold may be included in the instrumentation logic received from the application server 104. If the time threshold has not been surpassed, then the sampler component 410 does not sample or cause the client computing device 102 to generate instrumentation data. If the time threshold has been surpassed, then the cookie can be reset/deleted, such that when the user subsequently performs an action, the cookie initializer component 408 can re-initialize the cookie (or a newly provided cookie).

If the sampler component 410 determines that the winner bit has been set, then the sampler component 410 can determine whether a time limit or a transaction limit has been surpassed. For instance, the sampler component 410 can analyze one or more timestamps in the cookie in connection with ascertaining whether a threshold amount of time has been surpassed since the cookie was initialized by the cookie initializer component 408. As noted above, the time limit and transaction limit can be included in the instrumentation logic output by the application server 104.

If the time threshold and the transaction threshold have both not been surpassed, then the sampler component 410 can cause instrumentation data to be generated and formatted for transmission to a data repository. For instance, the sampler component 410 can assemble a serialized name pair data set URL. If the sampler component 410 determines that either the time threshold or the transaction threshold has been surpassed, then the cookie is reset/deleted, such that a subsequent action undertaken by the user can cause the cookie to be re-initialized (or a new cookie to be initialized). In other words, the sampler component 410 samples or causes the client computing device 102 to generate instrumentation data for a limited amount of time or for a limited number of transactions. Similarly, if the loser bit is set, the user is not sampled for the threshold amount of time.

The parser component 404 may additionally include an instrumentation transmitter component 412. The instrumentation transmitter component 412 can cause instrumentation data assembled in a URL to be transmitted to a data store that is defined in the instrumentation logic received by the client computing device 102.

With reference now to FIGS. 5-8, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Figure 5:
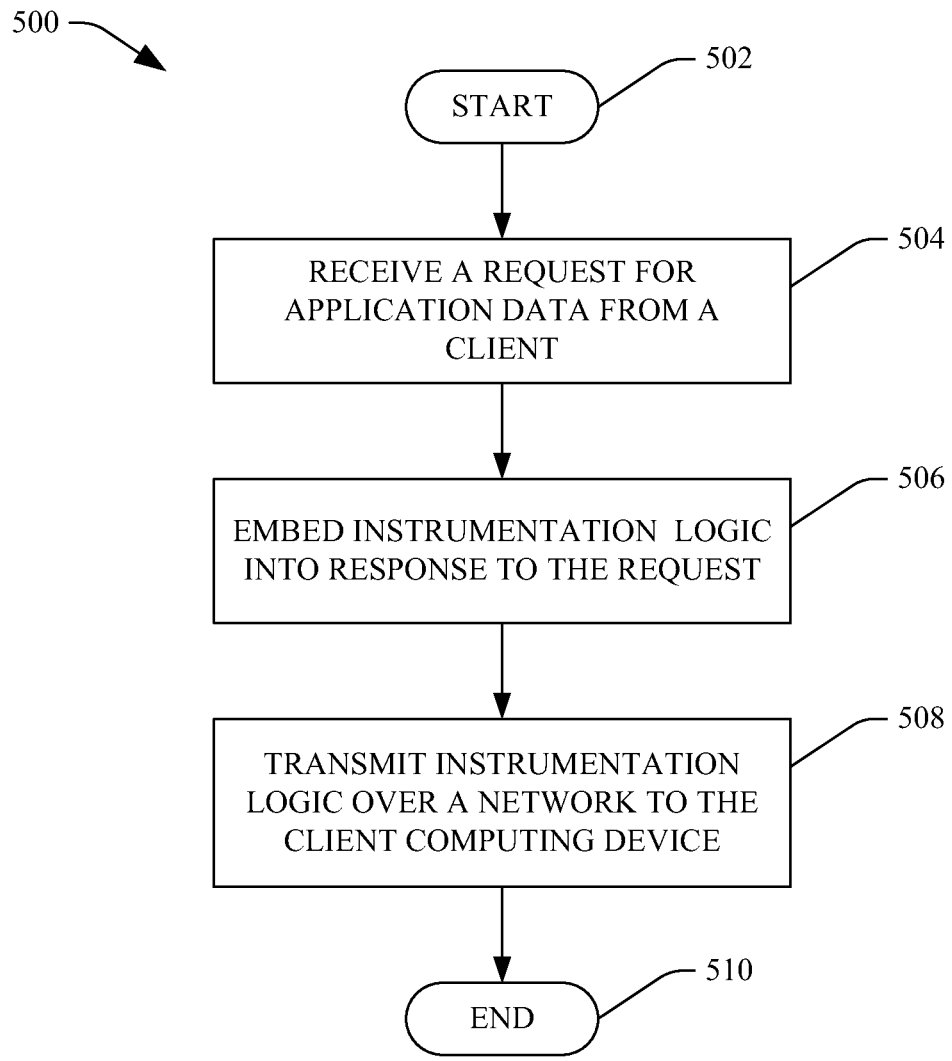
FIG. 5 is a flow diagram that illustrates an example methodology for obtaining instrumentation data from a client computing device.

Referring now to FIG. 5, a methodology 500 that facilitates causing a client computing device to generate instrumentation data is illustrated. The methodology 500 begins at 502, and at 504 a request for application data is received from a client computing device. The request may be a request for a web page, a request pertaining to an instant messaging application, an asynchronous data call (such as an Ajax call) or other suitable request that can be initiated by way of a network.

At 506, instrumentation logic is embedded in data that is provided to the client computing device responsive to receipt of the request. For instance, the instrumentation logic can be embedded in a web page provided to the client computing device.

At 508, instrumentation logic is transmitted over a network to the client computing device together with the application data. The instrumentation logic can be configured to cause the client computing device to perform a variety of acts including, but not limited to, determining if a user of the client computing device is desirably sampled. This determination can be made through analysis of a cookie pertaining to the application data requested by the client computing device. The instrumentation logic can be configured to further cause the client computing device to capture quantitative instrumentation data pertaining to the client computing device if the user of the client computing device is desirably sampled. Additionally the instrumentation logic can be configured to cause the client computing device to transmit the quantitative instrumentation data to a repository that it specifies in the instrumentation logic. The methodology 500 completes at 510. For example the methodology 500 may be implemented on an application server such as a web server.

Figure 6:
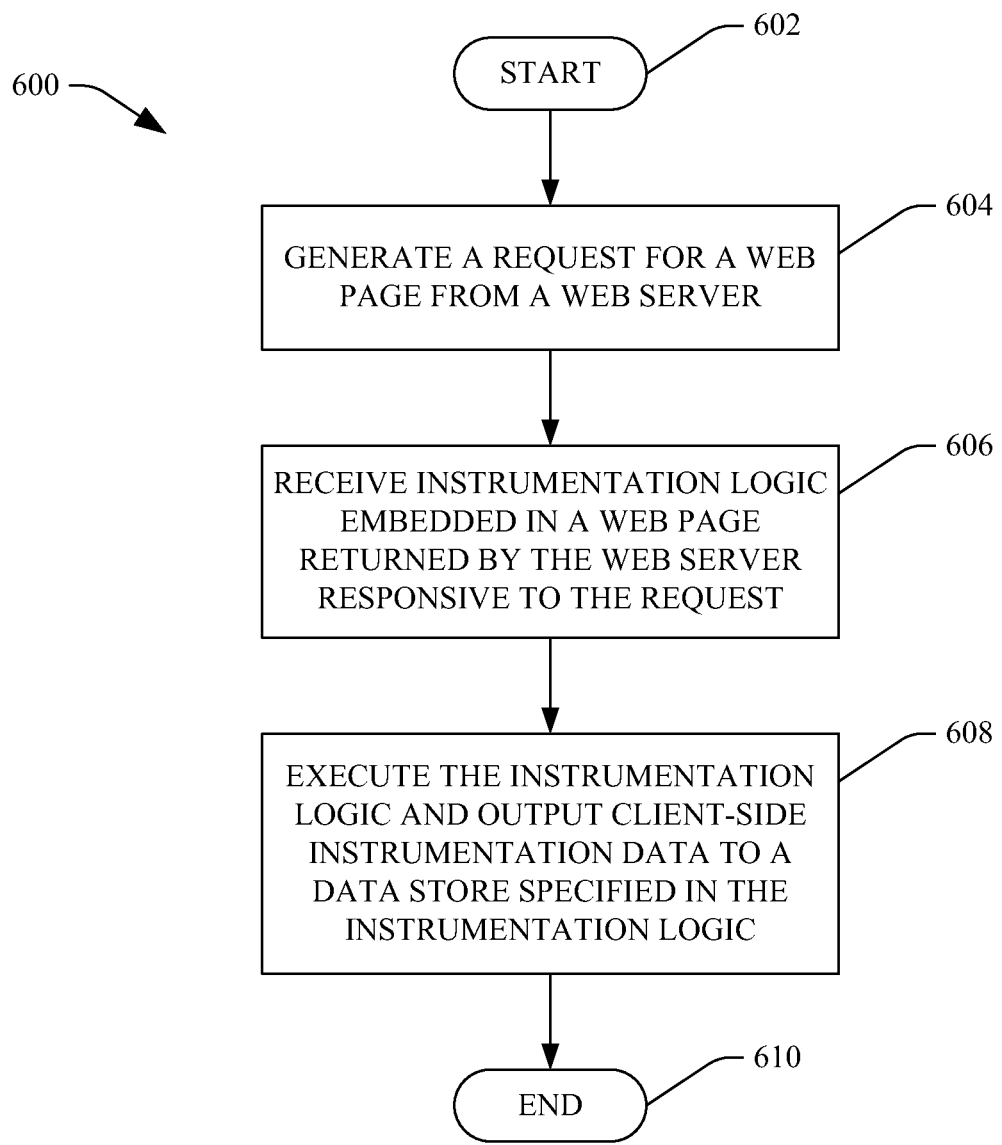
FIG. 6 is a flow diagram that illustrates an example methodology for executing instrumentation logic in connection with outputting instrumentation data pertaining to a client computing device.

Turning now to FIG. 6, an example methodology 600 for generating instrumentation data is illustrated. In an example, the methodology 600 may be executed on a client computing device. The methodology 600 starts at 602, and at 604 a request for a web page from a web server is generated. This request can be made responsive to a user entering a URL in a web browser, responsive to the user selecting a link, etc.

At 606, instrumentation logic is received, wherein the instrumentation logic is embedded in a web page returned by the web server in response to the request generated at 604. For instance, the instrumentation logic may include a JavaScript file, configuration settings, amongst other data.

At 608, at least a portion of the instrumentation logic is executed and client side instrumentation data is output to a data store specified in the instrumentation logic. Types of instrumentation data have been described above. The methodology 600 completes at 610.

Figure 7:
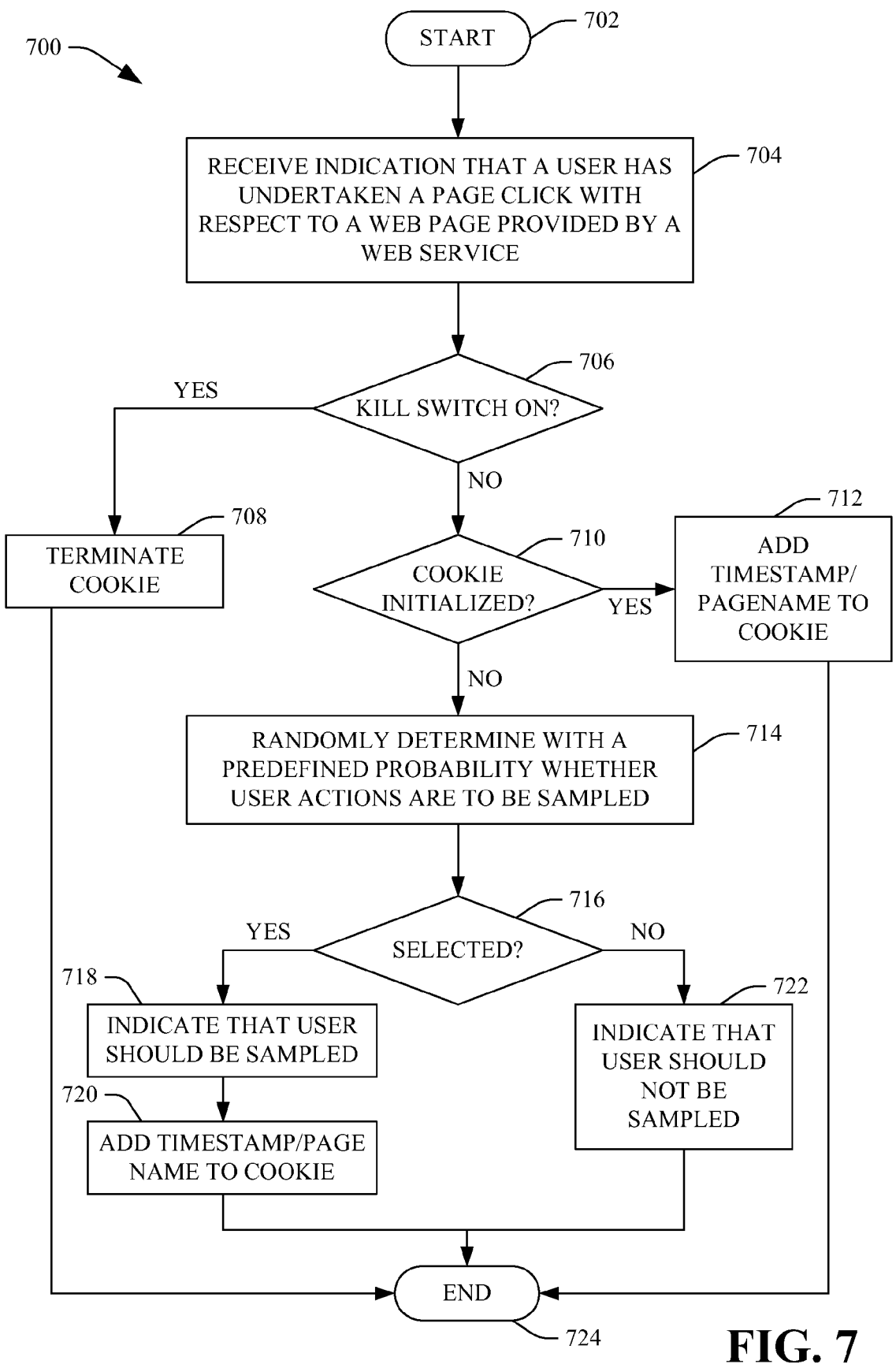
FIG. 7 is a flow diagram that illustrates an example methodology for determining whether a user should or should not be subjected to instrumentation sampling.

Now referring to FIG. 7, a methodology 700 that can be used in connection with managing a sampling session is illustrated. A sampling session may refer to a window of time or a series of transactions within which instrumentation data can be output from a client computing device. In an example, the methodology 700 may be executed on a client computing device.

The methodology 700 starts at 702, and at 704 an indication is received that a user has undertaken a page click with respect to a web page provided by a web service. For example, the web service may be an e-mail service. Furthermore, the page click may include selection of a link or other data that initiates an asynchronous data call. In another example, a page click may refer to providing a URL into a browser or clicking on a certain link.

At 706, instrumentation logic is analyzed to determine whether a kill switch has been set. For instance, the kill switch may be set if receiving instrumentation data is undesirable (e.g., bandwidth concerns make it desirable to refrain from receiving instrumentation data). If it is determined at 706 that the kill switch is on, then at 708 a cookie pertaining to the web service is terminated/reset. This cookie may be a session cookie or a permanent cookie.

If it is determined at 706 that the kill switch is not enabled, then at 710 a determination is made regarding whether the cookie has been initialized. Initialization of the cookie refers to setting parameters of the cookie such that it can be ascertained whether or not the user is desirably sampled. If the cookie has been initialized, then at 712 a time stamp is added to such cookie to indicate a current point in time. Additionally, a name of the page being viewed by the user is added to the cookie. Furthermore, a transaction count can be incremented if desired.

If at 710, it is determined that the cookie has not been initialized, then an initialization procedure can begin at 714. At 714, a determination regarding whether user actions are to be sampled is made randomly with a predefined probability. Such predefined probability can be included as configurations in instrumentation logic received by the client computing device. Sampling user actions refers to generating instrumentation data for various transactions undertaken by the user at the client computing device when the user is employing the web service. For instance, a transaction may be selection of an e-mail in an e-mail inbox, opening an e-mail, sending an e-mail, etc.

At 716, a determination is made regarding whether user actions are to be sampled. If it is determined at 716 that the user has been selected for sampling, then at 718 an indication is made that the user should be sampled. Such indication may be in the form of setting a certain bit in the cookie (e.g., a "winner"). Further, if it has been determined that the user has been selected for sampling, then at 720 a time stamp and/or page name can be added to the cookie to indicate a current point in time and/or name of a page being viewed by the user. Furthermore, a transaction count can be incremented if desired.

If it is determined at 716 that the user has not been selected for sampling, then at 722 an indication is made that the user should not be sampled. Again such indication may be in the form of setting a bit in the cookie (e.g., a "loser" bit). Pursuant to an example, after an indication has been made that the user should not be sampled, a time stamp and/or page name can be added to the cookie. The methodology 700 completes at 724.

Figure 8:
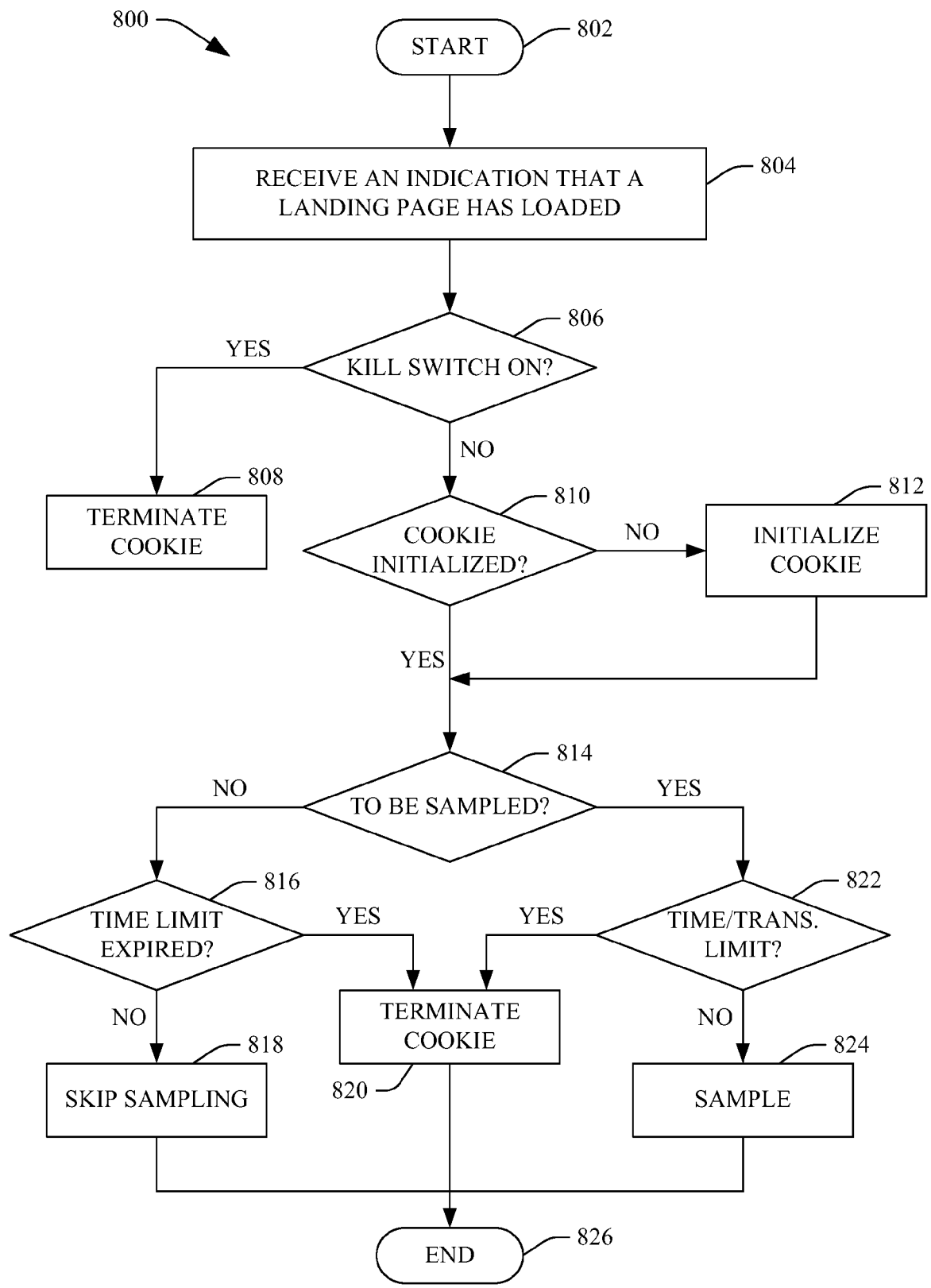
FIG. 8 is a flow diagram that illustrates an example methodology for checking time and/or transaction limits in connection with determining whether to generate instrumentation data.

Turning now to FIG. 8, an example methodology 800 pertaining to managing a sampling session with respect to generating instrumentation data at a client computing device is illustrated. For example, the methodology 800 may be executed on a client computing device.

The methodology 800 starts at 802, and at 804 an indication is received that a landing page has loaded. Loading a landing page can refer to loading an entirety of a new page in a web browser pertaining to a web service, loading asynchronous data received from a web server, etc. Furthermore, at 804 a timer can be stopped, wherein the timer was started upon a page click to the landing page.

At 806, a determination is made regarding whether a kill switch in instrumentation logic received at the client computing device is enabled. If it is determined that the kill switch is enabled, then at 808 a cookie is terminated/reset. If the kill switch is not on, then at 810 a determination is made regarding whether the cookie has been initialized (e.g., whether the cookie has been subjected to acts 714-720 of the methodology 700). If the cookie has not been initialized, then at 812 the cookie is initialized.

If it is determined at 810 that the cookie has been initialized, or after the cookie has been initialized at 812, a determination is made at 814 regarding whether the user is to be sampled. For instance, this determination can be made by reviewing a winner bit and/or a loser bit in the cookie as described above.

If it is determined that the user is not to be sampled, then at 816 a determination is made regarding whether a time limit has expired. Again, this determination can be made by analyzing content of the cookie. If the time limit as defined in received instrumentation logic has not expired, then at 818 sampling is terminated (e.g., no instrumentation logic is packaged and transmitted to a data store). If it is determined at 816 that the time limit has expired, then at 820 the cookie is terminated/reset. Thus, the next time that the user undertakes a page click, a cookie can be initialized and it can be determined whether it is desirable to perform sampling with respect to such user.

If at 814 it is determined that the user is desirably sampled (e.g., the "winner" bit has been set), then at 822 a determination is made regarding whether a time limit or a transaction limit has expired. The time limit and transaction limit can be defined in the instrumentation logic received at the client computing device. If either of the time limit or transaction limit has expired, then at 820 the cookie is terminated/reset. If it is determined at 822 that neither of the time limit or transaction limit has expired, then at 824 the user is sampled. In other words, instrumentation data is generated, packaged and transmitted to a data repository defined in the instrumentation logic received by the client computing device. The methodology 800 completes at 826.

Figure 9:
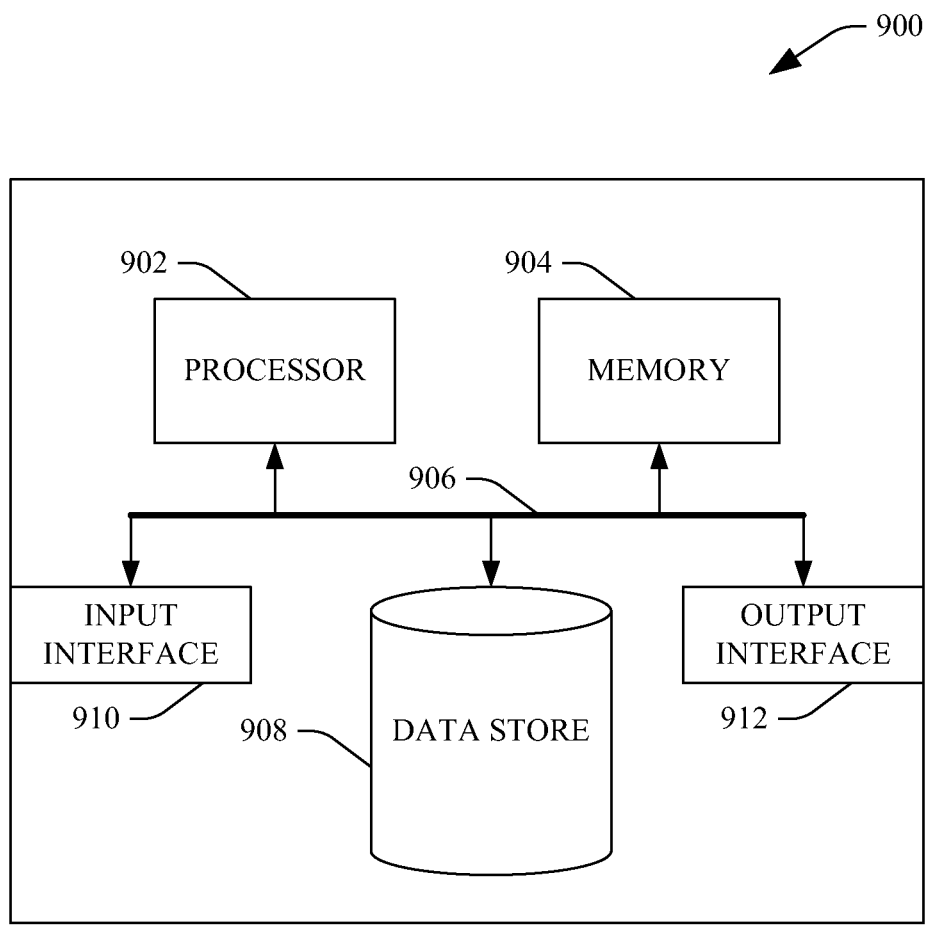
FIG. 9 is an example computing system.

Now referring to FIG. 9, a high-level illustration of an example computing device 900 that can be used in accordance with the systems and methodologies disclosed herein is illustrated. For instance, the computing device 900 may be used in a system that supports causing a client computing device to output instrumentation data. In another example, at least a portion of the computing device 900 may be used in a system that supports providing application services to client computing devices such as an e-mail application. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store cookies, web page data or other suitable application data.

The computing device 900 additionally includes a data store 908 that is accessible by the processor 902 by way of the system bus 906. The data store 908 may include executable instructions, server configurations, instrumentation configurations, instrumentation data, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. An apparatus comprising:
a processor; and
a memory, the memory comprising a plurality of components that are executable by the processor, the plurality of components comprising:
 a request receiver component that receives a request for a web site that corresponds to a web service over a network from a client computing device; and
 an instrumentation component that causes instrumentation logic to be transmitted to the client computing device responsive to receipt of the request for the web site, wherein the instrumentation logic is configured to:
  a) cause the client computing device to analyze a cookie to determine that instrumentation data pertaining to the client is desirably captured;
  b) cause the client computing device to capture quantitative instrumentation data pertaining to the requested web site, the quantitative instrumentation data comprising an amount of time to load the web site as measured at the client computing device; and
  c) cause the client computing device to transmit the quantitative instrumentation data over the network to a data repository.

2. The apparatus of claim 1 being a web server.

3. The apparatus of claim 1, wherein the web service is an e-mail service.

4. The apparatus of claim 1, wherein the instrumentation component causes the instrumentation logic to be embedded in a web page transmitted to the client computing device by way of the network.

5. The apparatus of claim 1, wherein the quantitative instrumentation data further comprises at least one of network latency between the client computing device and the apparatus, throughput of the network as experienced by the client computing device, size of a message received by the client computing device, transaction undertaken by the client computing device, country where the client computing device resides, identity of one or more servers communicating with the client computing device, browser type on the client computing device, resolution of a browser on the client computing device, or operating system used on the client computing device.

6. The apparatus of claim 1, wherein the instrumentation logic comprises a JavaScript file.

7. The apparatus of claim 1, wherein the instrumentation logic comprises an image tag that comprises an address of the data repository that is to receive the quantitative instrumentation data.

8. The apparatus of claim 1, wherein the instrumentation logic additionally causes a sampling session to be generated, wherein the sampling session comprises a time limit and a transaction limit.

9. The apparatus of claim 8, wherein if the client computing device is selected for sampling, sampling is terminated if the time limit is surpassed.

10. The apparatus of claim 8, wherein if the client computing device is selected for sampling, sampling is terminated if the transaction limit is surpassed.

11. A method executed by an application server that hosts application data, the method comprising the following computer-executable acts:
receiving a request for the application data from a client computing device;
responsive to receipt of the request, transmitting instrumentation logic over a network to the client computing device, wherein the instrumentation logic is configured to cause the client computing device to perform acts comprising:
 a) determining if the client computing device is desirably sampled based at least in part upon analysis of a cookie pertaining to the application data;
 b) when the client computing device is desirably sampled, capturing quantitative instrumentation data pertaining to the client computing device, the quantitative instrumentation data comprising a load time of a web page on the client computing device, and wherein content of the web page is based upon the application data; and
 c) transmitting the quantitative instrumentation data to a data repository specified in the instrumentation logic.

12. The method of claim 11, wherein the received request is for a web page from a web server.

13. The method of claim 12, wherein the web page corresponds to an e-mail application provided by the web server.

14. The method of claim 11, wherein the quantitative instrumentation data comprises at least one of load time of a web page, network latency between the client computing device and an application server, throughput of the network as experienced by the client computing device, size of a message received by the client computing device, transaction undertaken by the client computing device, country where the client computing device resides, identity of one or more servers communicating with the client computing device, browser type on the client computing device, resolution of a browser on the client computing device, or operating system used on the client computing device.

15. The method of claim 11, wherein the instrumentation logic is further configured to cause the client computing device to:
 d) determine if a number of transactions in a sampling session is above a threshold number of transactions;
 e) determine if a time of the sampling session is greater than a threshold amount of time; and
 f) if and only if it is determined that the number of transactions in the sampling session is below the threshold and the time of the sampling session is less than the threshold amount of time, cause the client computing device to capture the quantitative instrumentation data.

16. A computer-readable data storage device comprising instructions that, when executed by a processor, cause the processor to perform acts comprising:
receiving a request for a web page pertaining to an e-mail application from a client computing device;
generating the web page responsive to receipt of the request;
embedding instrumentation logic in the generated web page, wherein the instrumentation logic is configured to cause the client computing device to perform the following acts:

a. analyzing a cookie corresponding to the e-mail application;

b. based at least in part upon the analysis, causing the client computing device to capture instrumentation data, wherein the instrumentation data comprises information pertaining to load time of the web page, country of the client computing device, information identifying a web server that provides the web page, information identifying an operating system used by the client computing device, information identifying a browser used by the client computing device to view the web page, and data that indicates that the client computing device is operating in a cached session with an application server that hosts the email application.

17. The system of claim 1, wherein the instrumentation logic is further configured to:

generate a command to acquire an image file that resides on the application server, wherein the image file is acquired subsequent to the command being generated;

determine that the client computing device is in a cached session with the application server based upon contents of a header of the image file; and include data that indicates that the client computing device is in the cached session with the application server in the quantitative instrumentation data.

18. The system of claim 17, wherein the generated command is an HTTP Get command.

19. The system of claim 17, wherein the image file that resides on the application server has a caching policy that is identical to other image files on the application server.

20. The method of claim 11, wherein the request for application data is a request for a web site that corresponds to an e-mail service.

* * * * *